United States Patent
Schroeder

[15] 3,656,368
[45] Apr. 18, 1972

[54] BICYCLE HANDLE BAR

[72] Inventor: Joseph Martin Schroeder, 520 Porter Street, Glendale, Calif. 91205

[22] Filed: July 6, 1970

[21] Appl. No.: 52,242

[52] U.S. Cl. ....................................74/551.3, 74/551.6
[51] Int. Cl. ..........................................B62k 21/14
[58] Field of Search ...............74/551.1, 551.2, 551.3, 551.9, 74/551.6

[56] References Cited
FOREIGN PATENTS OR APPLICATIONS 655,086   4/1929   France..................................74/551.2
481,051   5/1953   Italy.....................................74/551.1
529,198   6/1955   Italy.....................................74/551.2

Primary Examiner—Milton Kaufman
Assistant Examiner—F. D. Shoemaker
Attorney—Pastoriza & Kelly

[57] ABSTRACT

A bicycle handle bar comprises resilient material such that it may be flexed up and down by a rider so that the rider will exercise his arms as well as his legs when riding the bicycle.

1 Claims, 3 Drawing Figures

PATENTED APR 18 1972 3,656,368

INVENTOR.
JOSEPH MARTIN SCHROEDER
BY Pastoriza & Kelly
ATTORNEYS

BICYCLE HANDLE BAR

This invention relates generally to bicycles and more particularly to a novel handle bar construction for bicycles for enabling a rider to exercise his arms as well as his legs while riding.

BACKGROUND OF THE INVENTION

Conventional bicycle handle bars are comprised of rigid tubing extending from a central bar portion in a general U shape and terminating in free ends which may incorporate rubber grips. Thus, while persons riding bicycles will thoroughly exercise their legs, little exercise is afforded their arms or shoulders since the only effort exerted by the arms is simply to steer the bicycle. It would be desirable to provide a bicycle in which both the arms and legs of a rider would be exercised if the rider so desires.

BRIEF DESCRIPTION OF THE PRESENT INVENTION

In view of the foregoing, it is a primary purpose of the present invention to provide an improved handle bar construction for bicycles wherein a bicycle rider may exercise his arms as well as his legs.

More particularly, the invention contemplates providing a bicycle handle bar in the form of resilient means extending from the central bar portion of the bicycle above the front wheel and terminating in transversely spaced free ends. Handle grips means are provided on the free ends so that the handle bar may be flexed up and down. The resilient means exerts a resisting force so that a person riding the bicycle may exercise his arms as well as his legs should he desire to do so.

In accord with a further feature of the invention, the handle grip means on the ends of the free ends of the handle bar each take the form of a resilient rubber-like material surrounding the associated free end, the material being of sufficient thickness that it may be manually contracted by squeezing the same so that a person may exercise his hand gripping muscles while riding the bicycle.

BRIEF DESCRIPTION OF THE DRAWINGS

A better understanding of the invention will be had by referring to one embodiment thereof as illustrated in the accompanying drawings, in which.

DETAILED DESCRIPTION OF THE INVENTION

Figure 1:
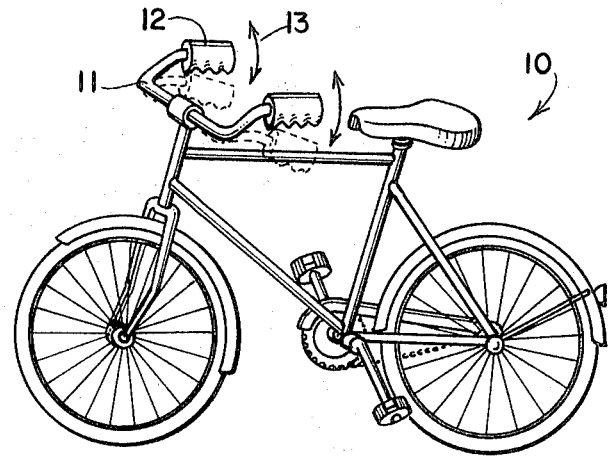
FIG. 1 is a perspective view of a bicycle incorporating the handle bar of this invention.

Referring first to FIG. 1 there is shown a bicycle 10 having a handle bar 11 terminating in transversely spaced free ends provided with suitable grip means such as indicated at 12. The handle bar 11 constitutes a resilient means such that the free ends may be flexed upwardly and downwardly as indicated by the double headed arrow 13 so that a rider may exercise his arms as well as his legs when riding the bicycle.

Figure 2:
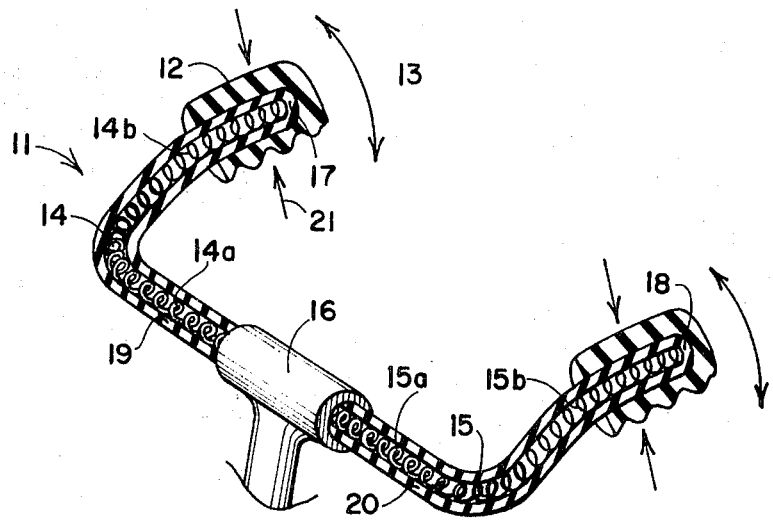
FIG. 2 is an enlarged fragmentary perspective view partly broken away to illustrate details of the handle bar construction; and, FIG. 3 is an enlarged fragmentary cross-section of one of the handle grip means incorporated in the handle bar of FIG. 2.

The structure of the handle bar 11 providing its resilient characteristics will be evident by now referring to FIG. 2. As shown, the resilient means comprises a coiled metal spring 14 and 15 extending from a central bar portion 16 constituting part of the bicycle frame 10 in a manner to define a general U shape, the free ends of the U being indicated at 17 and 18 and defining the transversely spaced free ends supporting the grip means such as 12. The coiled metal spring is surrounded by a sheath of rubber-like material 19 and 20 over the entire length of the coil to provide a smooth covering protecting the spring from the elements. This rubber-like material 19 is shown broken away in FIG. 2 to expose the interior coiled spring.

In a preferred construction, the diameter of the metal making up the coils of the spring is greater at the initial portions extending from the central bar 16 as indicated at 14a and 15a than at portions approaching the free ends as at 14b and 15b. By this construction, the coiled metal spring is stiffer at its initial portions than at its free end portions.

Figure 3:
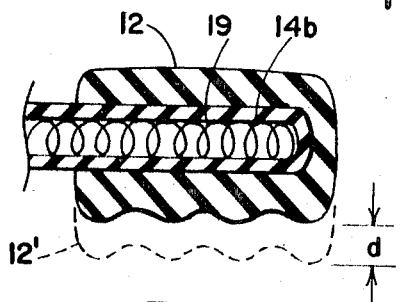

It will be noted in FIG. 2 that the grip means such as 12 is made up of a relatively thick resilient material such that it may be squeezed or contracted as indicated by the arrow 21. This feature is more clearly illustrated in FIG. 3 wherein the grip member 12 is shown in a squeezed or contracted position, its relaxed or expanded position being indicated by the dotted lines 12'. The distance between the lower periphery of the grip when in its contracted and expanded positions is indicated by the letter $d$ in FIG. 3 and is sufficient such that a person riding the bicycle may squeeze the grip and then relax his contracting pressure such that the gripping muscles of his hand are exercised.

OPERATION

The operation of the bicycle handle bar of this invention will be evident from the foregoing description.

A person riding the bicycle 10 of FIG. 1 will steer the bicycle by means of the handle bar 11 in the usual manner. However, because of the resilient construction of the handle bar, the rider may flex the handle bar up and down as described by the arrow 13 of FIG. 1. His arms and shoulders will thus be exercised.

Simultaneously, the rider may squeeze the hand grips and relax his pressure thereon periodically to exercise the gripping muscles of his hands. In the event a relatively slight person is riding the bicycle or perhaps a child, the greater flexibility or lesser stiffness of the handle bars towards their free ends as provided by the variation in the stiffness of the spring permits a smaller up and down motion to be readily effected by the rider. For a large strong man, a greater portion of the entire resilient means may be flexed with greater amplitude of movement in an up and down direction to thereby provide the greater exercise needed by a larger person.

From the foregoing description, it will be evident that the present invention has provided a greatly improved handle bar construction for bicycles wherein a rider can experience and achieve more exercise and greater health than is possible with conventional type bicycles.

What is claimed is:

1. A bicycle handle bar comprising: a resilient means in the form of a coiled metal spring having a surrounding sheath of rubber-like material, said coiled spring and rubber-like material extending from a central bar portion of the bicycle in a manner to define a general U shape; and handle grip means on the free ends of the U shape, said coiled metal spring being stiffer at its initial portions extending from said central bar than it is at portions approaching its free ends whereby said handle bar may be flexed up and down, said resilient means exerting a resisting force so that a person riding said bicycle can exercise his arms as well as his legs, each grip means comprising a resilient rubber-like grip surrounding the associated free end of said resilient means, said grip being of sufficient thickness that it may be manually contracted by squeezing the same so that said person may simultaneously exercise his hand gripping muscles while riding said bicycle.

* * * * *